LOUIS D. STATHAM
INVENTOR.

BY Philip Subkow

ATTORNEY

Aug. 2, 1960 L. D. STATHAM 2,947,962
STRAIN WIRE TRANSDUCER
Filed Feb. 10, 1958 4 Sheets-Sheet 2

LOUIS D. STATHAM
INVENTOR.

BY *Philip Subkow*

ATTORNEY

LOUIS D. STATHAM
INVENTOR.

BY Philip Subkow

ATTORNEY

LOUIS D. STATHAM
INVENTOR.

ATTORNEY

United States Patent Office 2,947,962
Patented Aug. 2, 1960

2,947,962
STRAIN WIRE TRANSDUCER

Louis D. Statham, Beverly Hills, Calif., assignor to Statham Instruments, Inc., Los Angeles, Calif., a corporation of California Filed Feb. 10, 1958, Ser. No. 714,142

9 Claims. (Cl. 338—4)

This application is a continuation-in-part of application Serial No. 632,921 filed January 7, 1957, now Patent No. 2,889,527, which in turn is a continuation-in-part of application Serial No. 605,098, filed August 7, 1957, which in turn is a continuation-in-part of application Serial No. 502,663, filed April 20, 1955, now Patent No. 2,760,037.

This invention relates to an improvement in strain gauges disclosed in U.S. Patent No. 2,760,037. See also U.S. Patents 2,760,038; 2,760,039; 2,760,040.

In these patents, an unbonded strain wire transducer is described, in which strain sensitive electrical resistance wires are stretched between a wire support which is yieldably mounted and a second wire support which is moved as a result of some force imposed on or some displacement of a motion transmitting connection connected to the second wire support. Another wire is stretched between the first wire support and a third wire support. The third support is so mounted that when the second wire support is displaced a relative motion occurs between the second and third wire support. In such transducers the displacement of the second and third wire supports relative to each other results in an increase in tension in one of the wires called an arm, and a decrease in tension in the other wire or arm. Because the change in tension is opposite in the two arms, they are termed "oppositely tensioned arms." They are called arms since the change in resistance in the wires may be measured by making these wires arms of a Wheatstone bridge.

Because the wires between the second wire support and the first and third wire supports may be of the same length and thus the gauge length of the transducer may be substantially zero, such transducers have been termed "zero gauge length" gauges or transducers and will be so named in this specification.

It is desirable in transducers of the unbonded type, in order to increase the voltage output of the Wheatstone bridge in which such wires are placed for measurement of the change of resistance induced by the change in tension in the wires, to obtain this increase by an increase in the resistance of the arms. To increase this resistance, the wires may be wound in loops between the second and the first and between the third and second wire supports. However, in zero gauge length transducers in which the yieldably mounted wire support is on insulated pins and both arms are connected to the same pin, a limit is imposed on the resistance of the wires which may be wound between the pin and other pins used as the second and third wire support.

It is necessary to space the wires forming the loops from each other in order to prevent short-circuiting between the wires. This permits the full length of the wires in the loops to be employed in producing the required resistance. Thus, if multiple turn loops are employed by both arms of the transducer connected to the yieldably mounted pin, this will require an extra-long pin. In order to keep the wires of the loops parallel longer pins at the second and third wire support must be used.

The longer pins employed increases the bending moment in the pins. Since the springs are employed to support the yieldably mounted pin, this increased bending moment may result in an undesirable form of bending of the spring.

The chamber in which the pin and wires are mounted must thus be of larger volume to accommodate the longer pin and the problem of transducer instability due to convection currents in the case is aggravated. This is further aggravated by the heating effect resulting from the high resistance of the wires.

Thus, in order to increase the total resistance of each arm without using multiple turn loops, the arms must be increased in length, thus increasing the overall length of the transducer. An additional disadvantage in employing a single pin to support both arms lies in the fact that, if in winding or using the transducer one loop breaks, due to some accident, it is usually necessary to rewind both loops of both arms.

These difficulties which I have discovered in working with such zero gauge length transducers result in certain limitations in the utility of these zero gauge length transducers. I have found that these difficulties, which have been discovered from experience with these transducers, may be solved simply by the expedient of employing separate pins for each arm. Thus, the wire loops which are connected to a yieldable mount, such as a spring, may be mounted on an armature carried on such spring. Adjacent pins are mounted in the armature. As a result of this expedient, we may increase the number of turns of the loops for each arm without increasing the height of the pin as compared with a transducer in which one pin carries both arms. This also permits me to employ larger diameter wires than when a single pin is employed, without increasing the length of the pin. This increases the stiffness of the wire loops and since the stiffness of the spring support depends on the stiffness of the arms, I may use stiffer springs and thus increase the ruggedness of the transducer. This also results in an increase in the initial tension to which the wires of the arms may be stressed and this simplifies the winding of the transducer.

By the use of loops of greater number of turns, I may make the arms shorter while maintaining the desired resistance and thus decrease the size of the transducer. The stiffness of the gauge is increased by reason of the increase in the number of turns in the loops, and the natural frequency of the gauge may thereby be increased. This also permits a reduction in the length of the transducer, since for the same change in strain and thus for the same voltage imposed across the Wheatstone bridge in which the arms are placed, the required displacement of the force summing means is less for a like output from the bridge.

These and other advantages and objects are obtainable by the expedient of supporting each of the oppositely tensioned arms in the pair of arms of the zero gauge length transducer on separate pin supports connected to a yieldable mounting for the pins. The following description, taken together with the drawings will further illustrate the preferred embodiment of my invention.

In the drawings:

Fig. 1 is a vertical section of a transducer employing my invention;
Fig. 2 is a section on line 2—2 of Fig. 1;
Fig. 3 is a section on line 3—3 of Fig. 2;
Fig. 4 is a section on line 4—4 of Fig. 2;
Fig. 5 is a section on line 5—5 of Fig. 2;
Fig. 6 is a section on line 6—6 of Fig. 1;

Figure 1:
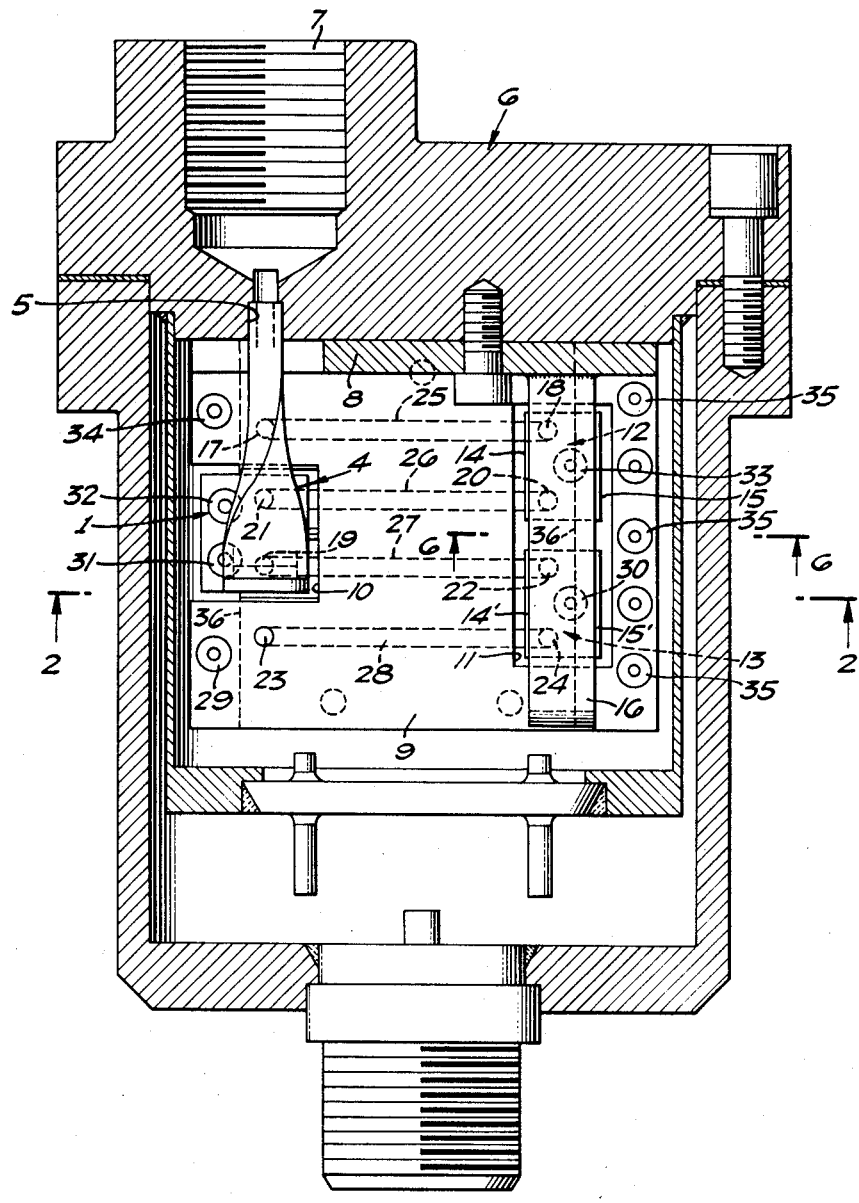
Figure 2:
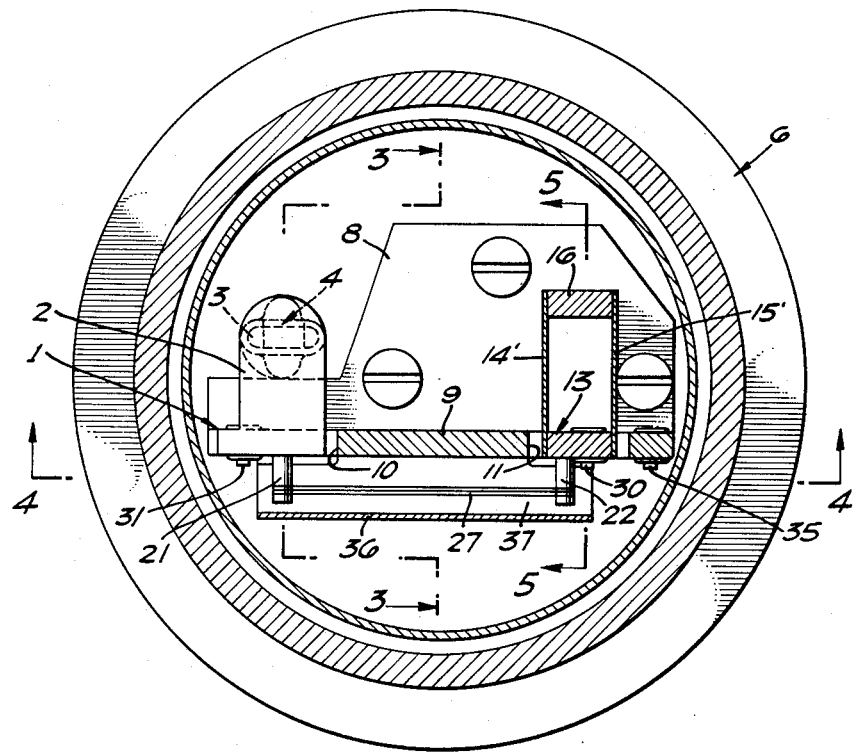

Referring to Fig. 1, the armature 1 of the zero gauge length unbonded electrical resistance strain wire transducer is integral with a bracket 2 carrying a plug 3. The plug fits into and seals the end of the flattened and twisted Bourdon tube 4. The opposite end of the tube 4 is mounted in the elliptical hole 5 in the base 6 of the pressure pickup in communication with a bore 7 which may be connected to a source of fluid pressure. The tube is twisted through 90°. The bracket 2 is perpendicular to the plane of the armature 1 and the axis of the tube 4. Thus on exertion of pressure in 4 the armature 1 will move through a small arc in the direction of the arrow A which is for all practical purposes of this device equivalent to rectilinear motion. Armature 1 is termed herein a force summing means. This motion is transmitted and converted into a varying tension of the arms of the zero gauge length transducer in the manner set forth more fully in the aforementioned U.S. Patent No. 2,760,037. However, to permit the obtainment of the improvement previously described, the mounting of the wires on the pins are made so that the wire loops of each of the oppositely tensioned arms are mounted on separate pins, as will be more fully described below.

The angle bracket 8 is provided with a web 9 and is mounted on the base 6 so that the web 9 extends substantially coplanar with the armature 1. The web 9 is notched at 10 to give room for mounting and for movement of the armature 1. The opposite end of the web 9 is cut out to form a rectangular hole 11. The web 9 forms the frame of the transducer. The armatures 12 and 13 are mounted in the hole 11 adjacent to each other on light flat leaf springs. The springs 14 and 15 are connected to the armature 12 and 14' and 15' are connected to the armature 13. The other end of the light springs 14, 15, 14' and 15' are connected to the bracket 16. The bracket 16 is connected to the bracket 8. The springs are prebent so that when the wires are stretched between the pins, the springs are pulled to the vertical position.

Insulated pins such as sapphire pins are positioned as follows:

Pins 17 and 23 are fixedly mounted in the web 9 adjacent armature 1. Pins 18 and 20 are mounted in the armature 12. The pins 22 and 24 are mounted in the armature 13. The pins 19 and 21 are mounted in the armature or force summing means 1. The axis of the pins 17, 19, 21 and 23 are aligned on a line parallel to the line on which the axis of the pins 18, 20, 22 and 24 are aligned. These lines are parallel to the planes of the leaf springs 14, 15, 14' and 15' and perpendicular to the line of motion of the armature 1.

The electrical resistance strain wire loop 25 is wound about pins 17 and 18 in a multiple turn loop of continuous wire, the terminals of which are connected electrically to terminal 34 and 33 respectively. The wire loops 26, 27 and 28 are wound similarly to loop 25 about pins 20 and 21; 19 and 22; and 23 and 24 respectively. The total length of wire and the tensions in each loop 25, 26, 27 and 28 are the same. They are in amount and relation as is described for the wire system of the Statham Patent 2,760,037, to which reference is made for further detail. The loop 26 is connected at each end electrically to terminals 32 and 33 respectively; the loop 27 to terminals 31 and 30 respectively and loop 28 to terminals 29 and 30 respectively. All of these loops may thus be connected to terminals 35 in the Wheatstone bridge arrangement conventional for four active wire electrical strain wire transducers.

Pin 19 constitutes a first support for the wire 27, pin 23 a second support for wire 28, and 13 is the yieldably mounted armature to which wires 27 and 28 are connected by means of the separate pins 22 and 24, respectively. Pin 21 constitutes a third support for the wire 26, pin 17 a fourth support for wire 25, and 12 is the yieldably mounted armature to which wires 26 and 25 are connected by means of the separate pins 20 and 18, respectively.

Figure 3:
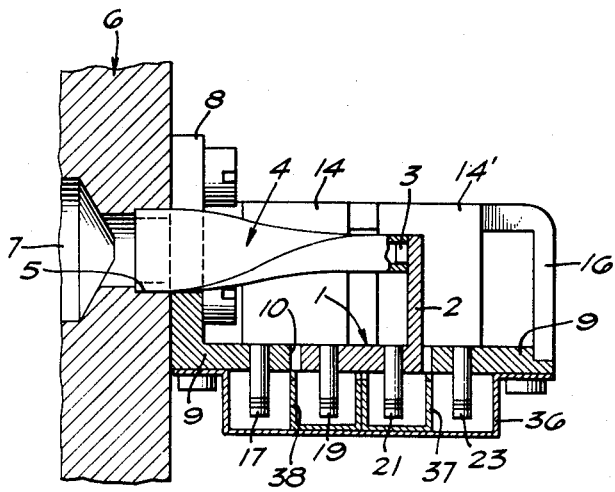
Figure 4:
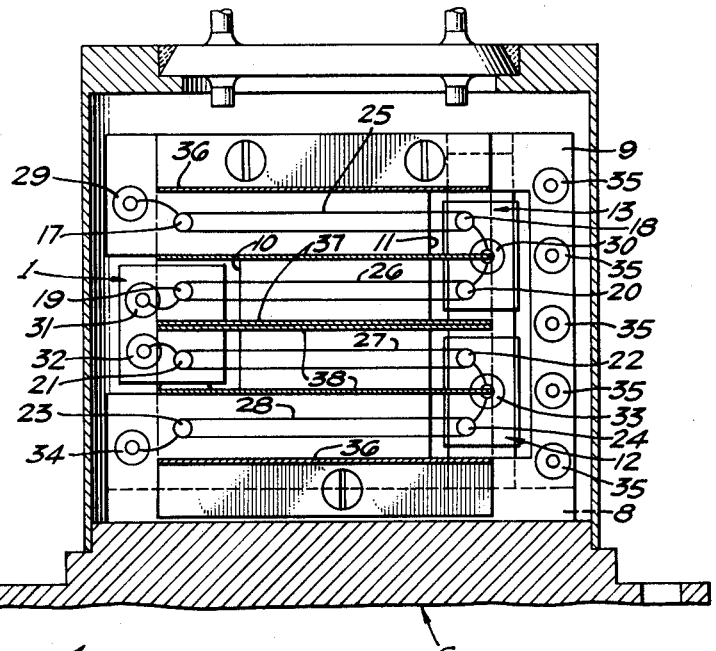
Figure 5:
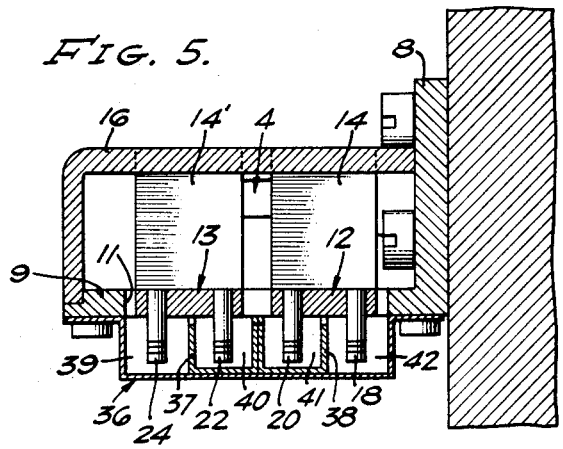
Figure 6:
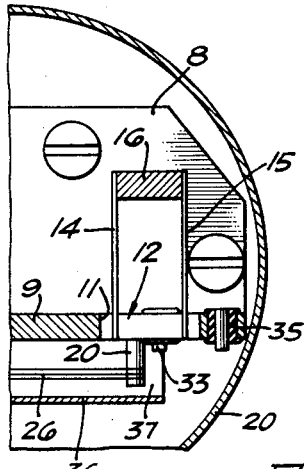

Thus on imposition of pressure in the twisted Bourdon tube 4 (see Figs. 1 and 3) the armature 1 is displaced to the left (see Fig. 1) increasing the tension and electrical resistance of the arms 26 and 27, and decreasing the tension and electrical resistance of arms 25 and 28.

In order to stabilize the response characteristic of the instrument, the wires are shielded from each other by means of the baffles 36, 37 and 38 which form the longitudinal extending open ended chambers 39, 40 and 41 and 42 whereby the wires are separated from each other by walls which extend longitudinally of the wire and reduce the volume of the air in immediate contact with said wires and prevent convection currents from passing directly from one wire loop to another wire loop. This is more fully described and claimed in a concurrently filed application Serial No. 714,141, filed February 10, 1958, to which reference is hereby made.

While I have described as a preferred embodiment in which the oppositely tensioned active arms extend in parallel loops, the axis of the loops need not be parallel but may make any convenient acute angle. Reference to the aforesaid Statham Patent No. 2,760,037 and the other patents referred to above will disclose the basic principles and form of transducer in which the improvement of the application may be embodied. The separation of the wire support for the wires when it is connected to the yieldable mount as described herein may also be applied to the forms of transducer described and claimed in my applications Serial No. 714,141.

Figure 7:
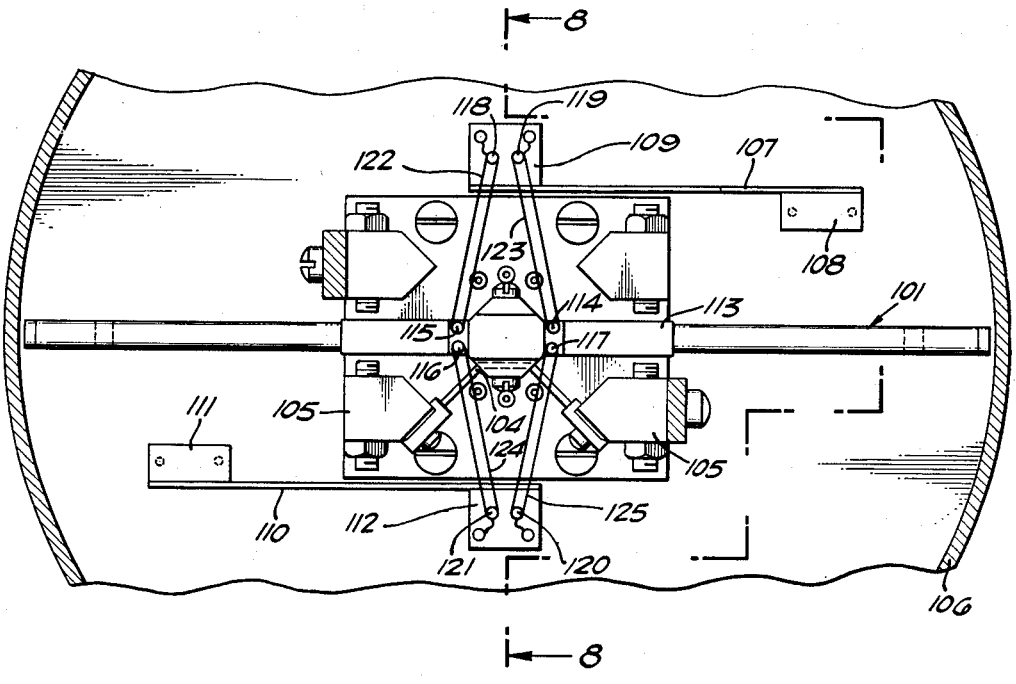
Fig. 7 is a section taken through another form of the transducer of my invention.
Figure 8:
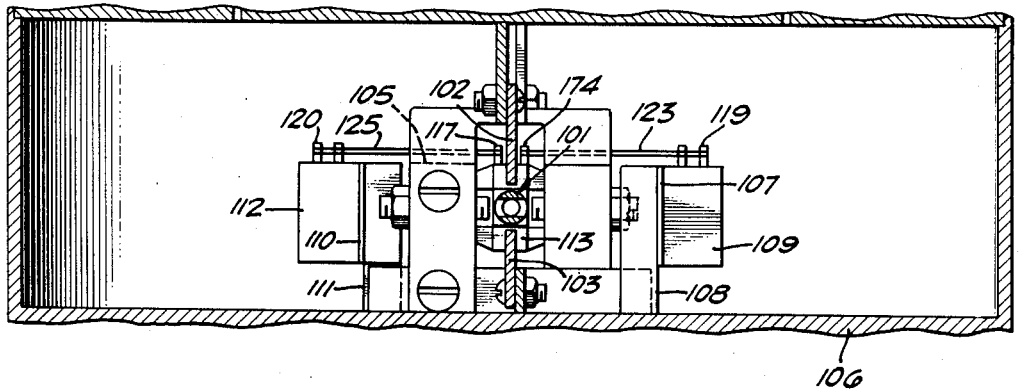
Fig. 8 is a section on line 8—8 of Fig. 7.

Figs. 7 and 8 show the application of the transducer in the form in which the wire supports, other than the yieldably mounted wire supports, both move, there being a relative motion with respect to each other. This form is also disclosed in said Statham Patent No. 2,760,037. However, the form as there disclosed has been modified so that each loop extends between separate pins and no two loops are mounted on the same pair of pins.

The form shown in Figs. 7 and 8 shows an adaptation of the zero gauge length transducer to the liquid-filled accelerometer also disclosed and claimed in the Statham U.S. Patent Nos. 2,778,905; 2,778,624.

In Figs. 7 and 8, the paddle 101 is mounted between baffles 102 and 103 for angular displacement on the springs 104. The springs are mounted on supports 105 in the base of the case 106, in which the baffles 102 and 103 are mounted to extend above and below the paddle. Flat spring 107 is mounted on support 108 and carries an armature 109. A like spring 110 is mounted in the case 106 on support 111 and carries an armature 112. The springs are prebent for purposes described below.

The bar 113 on which the hollow arms of the paddle are mounted carries four insulated pins such as sapphire pins, to wit, pins 114, 115, 116 and 117. The pins 114 and 115 are aligned on a line parallel to the line on which the pins 116 and 117 are aligned. The pins 118 and 119 are mounted on the armature 109 and like pins 120 and 121 are mounted on the armature 112. Pins 118 and 119; 115 and 114; 116 and 117; and 120 and 121 are all aligned on parallel lines, as shown in Fig. 7. A multiple turn loop 122 is wound about pins 118 and 115 and like loops 123 are wound about pins 119 and 114 and loop 124 about pins 121 and 116 and loop 125 about pins 117 and 120 in equal tension to bring the springs 107 and 110 in parallel position and place the loops in desired tension. The ends of the loops are connected to terminals for arrangement similar to the Wheatstone bridge arrangement previously described.

The case 106 is filled with a liquid as described in the above patents. On angular acceleration of the case a displacement of the paddle relative to the case occurs.

Pins 114 and 115 move relative to each other, as do pins 116 and 117. The pins 118 and 119 and 121 and 120 are yieldably supported on the springs 110 and 107 mounted in the case which forms the frame of the zero gauge length transducer.

While I have described particular embodiments of my invention, it should be understood that various modifications and adaptations thereof may be made within the spirit of the invention as set forth in the appended claims.

I claim:

1. An electrical strain wire transducer of the unbonded type which comprises a first wire support, a frame, an armature yieldably mounted on said frame, a pair of pins mounted in said armature in adjacent side by side relation, a second wire support mounted adjacent to the first wire support, strain wires extending in tension between said first wire support and one of said pins in a loop of multiple turns, a second multiple turn loop extending in tension between said second wire support and the other of said pins, means for moving said first and second wire supports relative to each other whereby one loop increases in tension while the other loop decreases in tension.

2. In the transducer of claim 1 in which said armature is mounted on a spring connected to said frame.

3. In the transducer of claim 1 in which the second wire support is fixedly mounted on said frame.

4. In the transducer of claim 3 in which the armature is mounted on a spring connected to said frame.

5. In the transducer of claim 1, a third support, and a fourth support mounted adjacent to said third support, a second armature, yieldably mounted on said frame, a second pair of pins mounted in said last named armature adjacent to each other, a strain wire extending in tension between said third support and one of said last named pins in a loop of multiple turns and a multiple turn loop of strain wire extending in tension between the fourth support and the other of said pins, said third and fourth supports moving relative to each other on relative movement of said first and second support, whereby one of said last named loops increases in tension while the other of said last named loops decreases in tension and means for connecting all of said wires in a Wheatstone bridge arrangement.

6. In the transducer of claim 5 in which said yieldably mounted armatures are each mounted on a separate spring connected to the frame.

7. In the transducer of claim 5 in which said first and said third wire support are fixedly mounted in said frame and a motion transmitting connection connected to said second and fourth wire supports.

8. In the transducer of claim 7 in which said yieldably mounted armatures are each mounted on a separate spring connected to the frame.

9. An electrical strain wire transducer of the unbonded type which comprises a first wire support, a frame, an armature yieldably mounted on said frame, a pair of pins in said armature mounted adjacent each other on the same side of said armature, the position of said pins being fixed with respect to each other during movement of said armature, a second wire support mounted adjacent to the first wire support, strain wires extending in tension between said first wire support and one of said pins in a loop of multiple turns, a second multiple turn loop extending in tension between said second wire support and the other of said pins, said first and second wire supports being movable relative to each other whereby one loop increases in tension while the other loop decreases in tension, and a force summing means connected to at least one of said first and second wire supports.

References Cited in the file of this patent
UNITED STATES PATENTS
2,697,158   Epstein et al. _____ Dec. 4, 1954